(12) United States Patent
Wang

(10) Patent No.: US 11,689,109 B2
(45) Date of Patent: Jun. 27, 2023

(54) INPUT-PARALLEL OUTPUT-SERIES MULTI-CONVERTER SWITCHING POWER SUPPLY

(71) Applicant: Hangzhou MPS Semiconductor Technology Ltd., Hangzhou (CN)

(72) Inventor: Siran Wang, Hangzhou (CN)

(73) Assignee: Hangzhou MPS Semiconductor Technology Ltd., Hangzhou (CN)

( * ) Notice: Subject to any disclaimer, the term of this patent is extended or adjusted under 35 U.S.C. 154(b) by 113 days.

(21) Appl. No.: 17/525,104

(22) Filed: Nov. 12, 2021

(65) Prior Publication Data
US 2022/0166325 A1    May 26, 2022

(30) Foreign Application Priority Data
Nov. 25, 2020  (CN) .......................... 202011342411.0

(51) Int. Cl.
*H02M 3/335* (2006.01)
*H02M 1/08* (2006.01)

(52) U.S. Cl.
CPC ......... *H02M 3/33523* (2013.01); *H02M 1/08* (2013.01); *H02M 3/33515* (2013.01)

(58) Field of Classification Search
CPC . H02M 3/33523; H02M 1/08; H02M 3/33515
USPC ...................................... 363/21.13
See application file for complete search history.

(56) References Cited

U.S. PATENT DOCUMENTS

2020/0313561 A1* 10/2020 Moore .................. H02M 1/08
2023/0025867 A1*  1/2023 Woo ...................... H02M 3/01

* cited by examiner

*Primary Examiner* — Yemane Mehari
(74) *Attorney, Agent, or Firm* — Perkins Coie LLP

(57) ABSTRACT

A multi-converter switching power supply includes a first switching converter with a first output capacitor, a second switching converter with a second output capacitor, a bypass switch coupled across the second output capacitor, and a bypass control circuit for controlling the bypass switch. Input terminals of the first and switching converters are coupled in parallel, while output terminals of the first and switching converters are coupled in series to provide a total output voltage to a load. When detecting that the second output voltage approaches a negative voltage, the bypass control circuit turns on the bypass switch, so as to protect the second output capacitor from being damaged by a reverse DC voltage.

16 Claims, 6 Drawing Sheets

INPUT-PARALLEL OUTPUT-SERIES MULTI-CONVERTER SWITCHING POWER SUPPLY

CROSS-REFERENCE TO RELATED APPLICATIONS

This application claims the benefit of CN application 202011342411.0, filed on Nov. 25, 2020, and incorporated herein by reference.

TECHNICAL FIELD

The present invention generally relates to electronic circuits, and more particularly but not exclusively, to multi-converter switching power supplies.

BACKGROUND

For high-power loads with operating voltage varying in a wide range, it might be hard for a single switching converter to meet the load requirements. In this situation, a multi-converter switching power supply with parallel inputs and serial outputs could be a good solution.

However, since the voltage provided to load varies largely, how to ensure safe and efficient operation of the multi-converter switching power supply becomes a challenge.

SUMMARY

Embodiments of the present invention are directed to a multi-converter switching power supply, which includes a first switching converter, a second switching converter, a bypass switch and a bypass control circuit. The first switching converter has a first input terminal, a second input terminal, a first output terminal, a second output terminal, and a first output capacitor coupled between the first output terminal and the second output terminal, wherein the first and second input terminals are configured to receive an input voltage, and the first switching converter is configured to convert the input voltage into a first output voltage across the first and second output terminals. The second switching converter has a first input terminal, a second input terminal, a first output terminal, a second output terminal, and a second output capacitor coupled between the first output terminal and the second output terminal, wherein the first and second input terminals are configured to receive the input voltage, and the second switching converter is configured to convert the input voltage into a second output voltage across the first and second output terminals. The first output terminal of the second switching converter is coupled to the second output terminal of the first switching converter, the first output terminal of the first switching converter and the second output terminal of the second switching converter are configured to provide a total output voltage to a load. The bypass switch has a first terminal, a second terminal and a control terminal, wherein the first terminal is coupled to the first output terminal of the second switching converter, and the second terminal is coupled to the second output terminal of the second switching converter. The bypass control circuit is coupled to the control terminal of the bypass switch and configured to detect whether the second output voltage approaches a negative voltage. When the second output voltage is detected to approach a negative voltage, the bypass control circuit turns on the bypass switch to bypass the second output capacitor, so as to protect the second output capacitor from being damaged by a reverse DC voltage.

Embodiments of the present invention are also directed to a control method used in the multi-converter switching power supply. The control method includes: coupling a bypass switch across the second output capacitor; determining whether the switching power supply is in a low output voltage state; disabling the second switching converter when the multi-converter switching power supply is in the low output voltage state; and turning on the bypass switch to bypass the second output capacitor, so as to protect the second output capacitor from being damaged by a reverse DC voltage.

Embodiments of the present invention are further directed to a converter control circuit of a multi-converter switching power supply. The multi-converter switching power supply includes a first switching converter with a first switch and a first output capacitor, a second switching converter with a second switch and a second output capacitor, and a bypass switch coupled across the second output capacitor. Input terminals of the first and second switching converters are coupled in parallel to receive an input voltage, while output terminals of the first and second switching converters are coupled in series to provide a total output voltage to a load. The converter control circuit comprises: a modulation signal generator configured to generate a modulation signal; a first comparison circuit coupled to the modulation signal generator, wherein the first comparison circuit is configured to generate a first comparison signal based on the modulation signal and a feedback signal indicative of the total output voltage; a second comparison circuit configured to generate a second comparison signal based on a current threshold reference signal and a first current sensing signal representing a current flowing through the first switch; a first logic circuit coupled to the first comparison circuit and the second comparison circuit, wherein based on the first comparison signal and the second comparison signal, the first logic circuit generates a first control signal to control the first switch; a phase shift controller coupled to the first logic circuit, wherein the phase shift controller is configured to generate a turn-on control signal based on the first control signal; a third comparison circuit configured to generate a third comparison signal based on the current threshold reference signal and a second current sensing signal representing a current flowing through the second switch; and a second logic circuit coupled to the phase shift controller and the third comparison circuit, wherein based on the turn-on control signal and the third comparison signal, the second logic circuit generates a second control signal to control the second switch.

BRIEF DESCRIPTION OF THE DRAWING

The present invention can be further understood with reference to following detailed description and appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1:
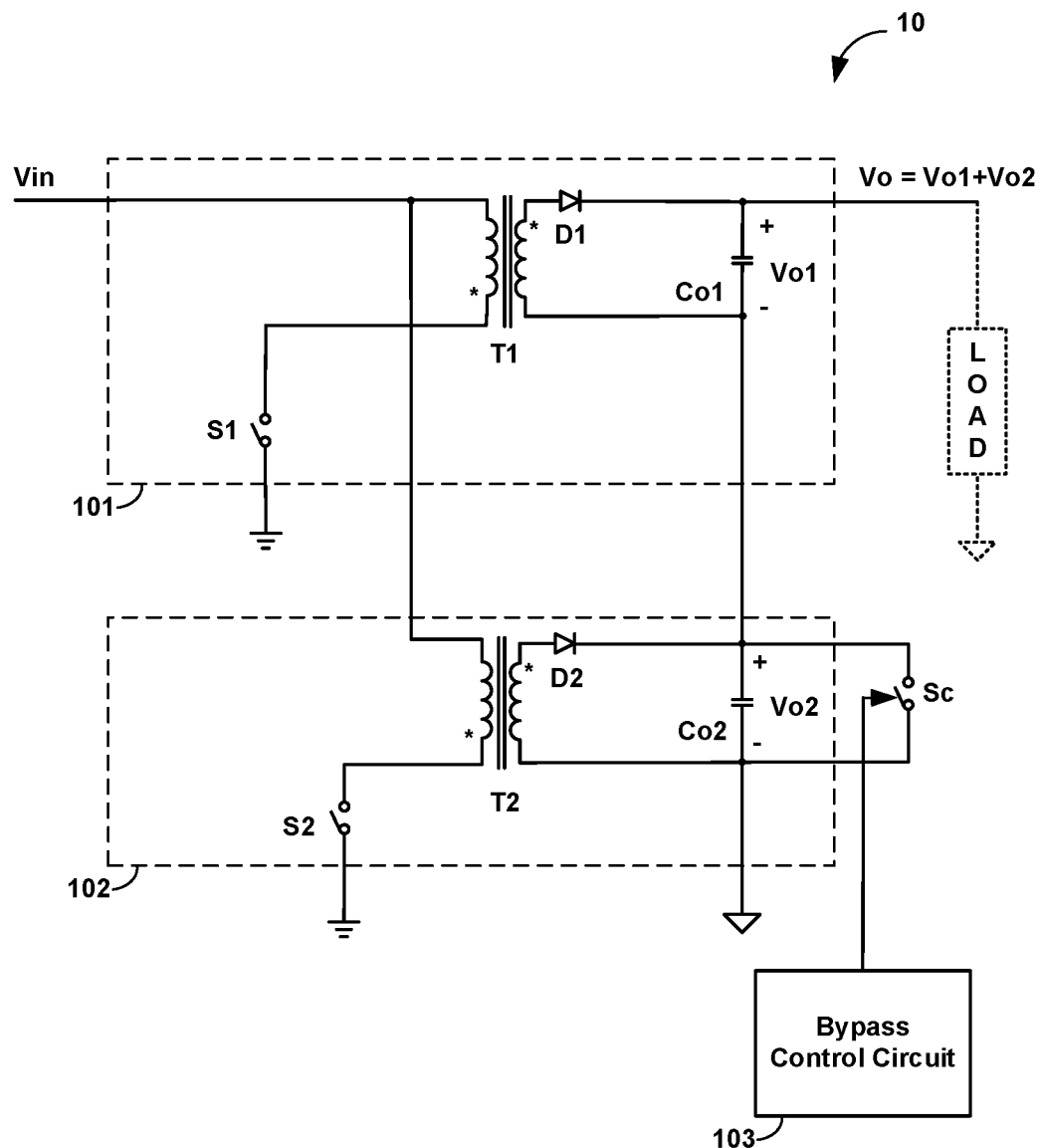
FIG. 1 schematically illustrates a multi-converter switching power supply 10 in accordance with an embodiment of the present invention.

FIG. 1 schematically illustrates a multi-converter switching power supply 10 in accordance with an embodiment of the present invention. The switching power supply 10 includes switching converters 101 and 102. The input terminals of the switching converters 101 and 102 are connected in parallel, while the output terminals are connected in series. A sum of the output voltage of the two switching converters is used as a total output voltage of the switching power supply and provided to a downstream load, which requires high power and wide operating voltage range.

Specifically, as shown in FIG. 1, the switching converter 101 has a first input terminal, a second input terminal, a first output terminal, and a second output terminal, wherein the first input terminal and the second input terminal are configured to receive an input voltage Vin. The switching converter 101 converts the input voltage Vin into a first output voltage Vo1 and provides it to the first output terminal and the second output terminal. The switching converter 102 also has a first input terminal, a second input terminal, a first output terminal, and a second output terminal, wherein the first input terminal and the second input terminal are configured to receive the same input voltage Vin. The switching converter 102 converts the input voltage Vin into a second output voltage Vo2 and provides it to the first output terminal and the second output terminal. The first output terminal of the switching converter 102 is coupled to the second output terminal of the switching converter 101. The first output terminal of the switching converter 101 and the second output terminal of the switching converter 102 are respectively coupled to a load to provide a total output voltage Vo. In one embodiment, the rated operating voltage range of the load is 5V-150V, and the load current could be up to 2 A. In the embodiment shown in FIG. 1, the second output terminal of the switching converter 102 is coupled to a reference ground, while the first output terminal of the switching converter 101 is used to provide the total output voltage Vo. However, those skilled in the art could understand that this is not intended to limit the present invention. In practical applications, positions of the switching converters 101 and 102 in FIG. 1 can be interchanged.

The switching converters 101 and 102 usually adopt same topology and substantially same control scheme. They can operate in the phase or interleave with each other (for example, their phases could be staggered by 180 degrees). In the embodiment shown in FIG. 1, the switching converters 101 and 102 are both flyback converters, wherein the switching converter 101 includes a switch S1, a transformer T1 and a diode D1, the switching converter 102 includes a switch S2, a transformer T2 and a diode D2.

In order to reduce ripples and stabilize the output voltage, the output terminals of the switching converters 101 and 102 are usually coupled with output capacitors. As shown in FIG. 1, an output capacitor Co1 is coupled between the first and second output terminals of the switching converter 101, while an output capacitor Co2 is coupled between the first and second output terminals of the switching converter 102. Considering factors such as capacity, price and volume, the output capacitors Co1 and Co2 usually use electrolytic capacitors, such as aluminum electrolytic capacitors. Aluminum electrolytic capacitors are capacitors with aluminum foil and electrolyte used as electrodes, and aluminum oxide film, which is formed on the aluminum foil, used as dielectric. Due to this structure, the aluminum electrolytic capacitor has polarity, and can only withstand a positive DC voltage where an electrical potential of the anode aluminum foil is higher than that of the catholyte. If the aluminum electrolytic capacitor is subjected to a reverse DC voltage (the electrical potential of the anode aluminum foil is lower than that of the catholyte), the aluminum oxide film will wear thin due to the Hydrogen Ion Theory, causing the capacitor to be easily broken down and damaged. Typically, under a reverse DC voltage of 1V-2V, aluminum electrolytic capacitors may fail within a few seconds.

Generally speaking, during normal operation, energy transferred to the load is provided by both of the switching converters 101 and 102. The output voltages Vo1 and Vo2 are both positive, thus the output capacitors Co1 and Co2 both withstand a positive DC voltage. When the switching power supply enters a low output voltage state (the total output voltage Vo required by the load is low, for example, lower than a threshold voltage), in order to reduce switching loss, the switching converter 102 can be disabled, and the energy provided to the load is only provided by the switching converter 101. At this moment, although the switching converter 102 has already been disabled, the load current will continue to flow through the output capacitor Co2, causing the output capacitor Co2 to continuously discharge. This may get the second output voltage Vo2 to become a negative voltage, and cause the output capacitor Co2 to fail due to the reverse DC voltage.

Therefore, in order to protect the output capacitor Co2 from failure, the switching power supply 10 of FIG. 1 is further provided with a bypass switch Sc and a bypass control circuit 103. The bypass switch Sc has a first terminal, a second terminal and a control terminal, wherein the first terminal is coupled to a first terminal of the output capacitor Co2, and the second terminal is coupled to a second terminal of the output capacitor Co2. The bypass control circuit 103 is coupled to the control terminal of the bypass switch Sc to control the on and off of the bypass switch Sc. When it is determined that the second output voltage Vo2 approaches a negative voltage, the bypass control circuit 103 turns on the bypass switch Sc to bypass the output capacitor Co2, thereby effectively preventing the output capacitor Co2 from being damaged by a reverse DC voltage. The second output voltage Vo2 approaching a negative voltage, as mentioned above, may include situations where the second output voltage Vo2 has a possibility of becoming a negative voltage, is about to become a negative voltage, and has already become a negative voltage.

In some embodiments, the bypass control circuit 103 compares the second output voltage Vo2 with a first threshold voltage Vth1 (e.g., 0V or a value slightly greater than 0V) to determine whether the second output voltage Vo2 approaches a negative voltage. When detecting that the second output voltage Vo2 is lower than the first threshold voltage Vth1, the bypass control circuit 103 determines that the second output voltage Vo2 approaches a negative voltage, and turns on the bypass switch Sc. When the second output voltage Vo2 is detected to be larger than a sum of the first threshold voltage Vth1 and a first hysteresis voltage Vhys1, the bypass control circuit 103 turns off the bypass switch Sc.

In other embodiments, the bypass control circuit 103 compares the total output voltage Vo with a second threshold voltage Vth2 (for example, 1V) to determine whether the second output voltage Vo2 approaches a negative voltage. When detecting that the total output voltage Vo is lower than the second threshold voltage Vth2, the bypass control circuit 103 determines that the second output voltage Vo2 approaches a negative voltage, and turns on the bypass switch Sc. When the total output voltage Vo is detected to be larger than a sum of the second threshold voltage Vth2 and a second hysteresis voltage Vhys2, the bypass control circuit 103 turns off the bypass switch Sc.

As aforementioned, the switching converter 102 can be disabled when the switching power supply enters a low output voltage state. In this case, optionally, when detecting that the switching converter 102 has been disabled, the bypass control circuit 103 could determine that the second output voltage Vo2 approaches a negative voltage, and then turn on the bypass switch Sc to bypass the output capacitor Co2. In some other embodiments, the bypass switch Sc can also be kept off, until the bypass control circuit 103 detects that the second output voltage Vo2 is lower than the first threshold voltage Vth1 or the total output voltage Vo is lower than the second threshold voltage Vth2. When the bypass switch Sc is turned on, the output capacitor Co2 is discharged through the bypass switch Sc and the load current. Eventually, the voltage Vo2 across the output capacitor Co2 will be clamped to $-I_o*R_{dson}$, wherein Io is a load current (that is, an output current of the switching power supply), and Rdson is an on-resistance of the bypass switch Sc.

Figure 2:
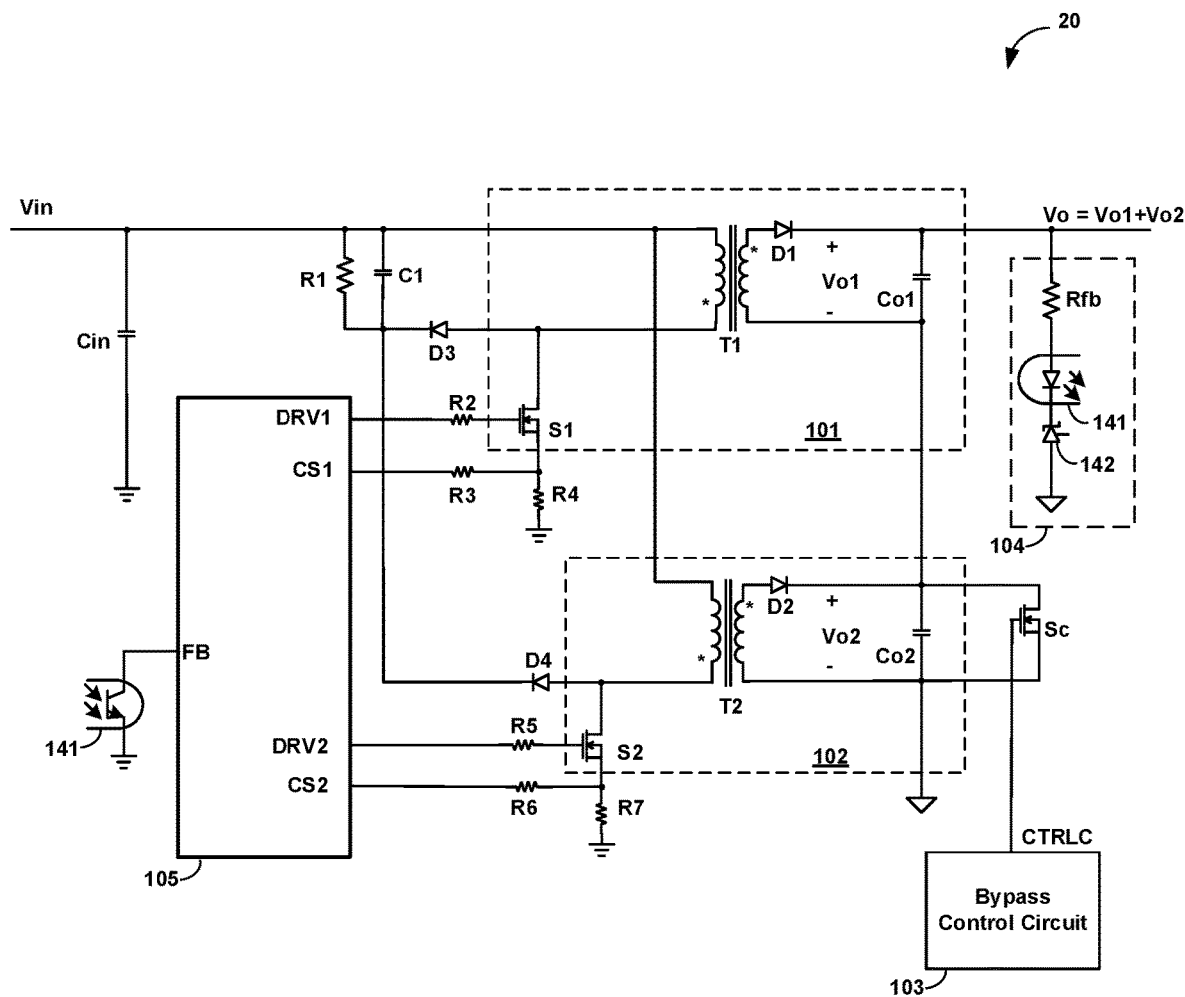
FIG. 2 schematically illustrates a multi-converter switching power supply 20 in accordance with an embodiment of the present invention.

FIG. 2 schematically illustrates a multi-converter switching power supply 20 in accordance with an embodiment of the present invention. Compared with the switching power supply 10 shown in FIG. 1, the switching power supply 20 further includes a feedback circuit 104 and a converter control circuit 105. The feedback circuit 104 is coupled to the first terminal of the output capacitor Co1, and generates a feedback signal FB based on the total output voltage Vo. The converter control circuit 105 is coupled to the feedback circuit 104. Based on the feedback signal FB, the converter control circuit 105 generates control signals DRV1 and DRV2 to respectively control the switches S1 and S2.

In the embodiment shown in FIG. 2, the switches S1, S2, and Sc are all N-type metal oxide semiconductor field effect transistors (NMOSFET). As shown in the figure, anodes of the diodes D3 and D4 are respectively coupled to drains of the switches S1 and S2, cathodes of the diodes D3 and D4 are coupled together. A resistor R1 and a capacitor C1 are connected in parallel and coupled between the input voltage Vin and the cathodes of diodes D3 and D4, so as to absorb surge noise. The feedback circuit 104 includes a resistor Rfb, a photo-coupler 141, and a programmable shunt regulator 142 (for example, a semiconductor device TL431). The converter control circuit 105 obtains a current sensing signal CS1 representing a current flowing through the switch S1 by resistors R3 and R4, and obtains a current sensing signal CS2 representing a current flowing through the switch S2 by resistors R6 and R7. Based on the current sensing signals CS1, CS2 and the feedback signal FB, the converter control circuit 105 generates the control signals DRV1 and DRV2, and provides them respectively to the gates of the switches S1 and S2 through resistors R2 and R5. The converter control circuit 105 may adopt any suitable control scheme, as long as the total output voltage Vo can be regulated to a target value required by the load. Although FIG. 2 shows many details of the feedback circuit and current sensing circuits, persons of ordinary skills in the art can understand that these details are not indispensable for the present invention, and thus could be omitted or replaced by other elements or structures.

Figure 3:
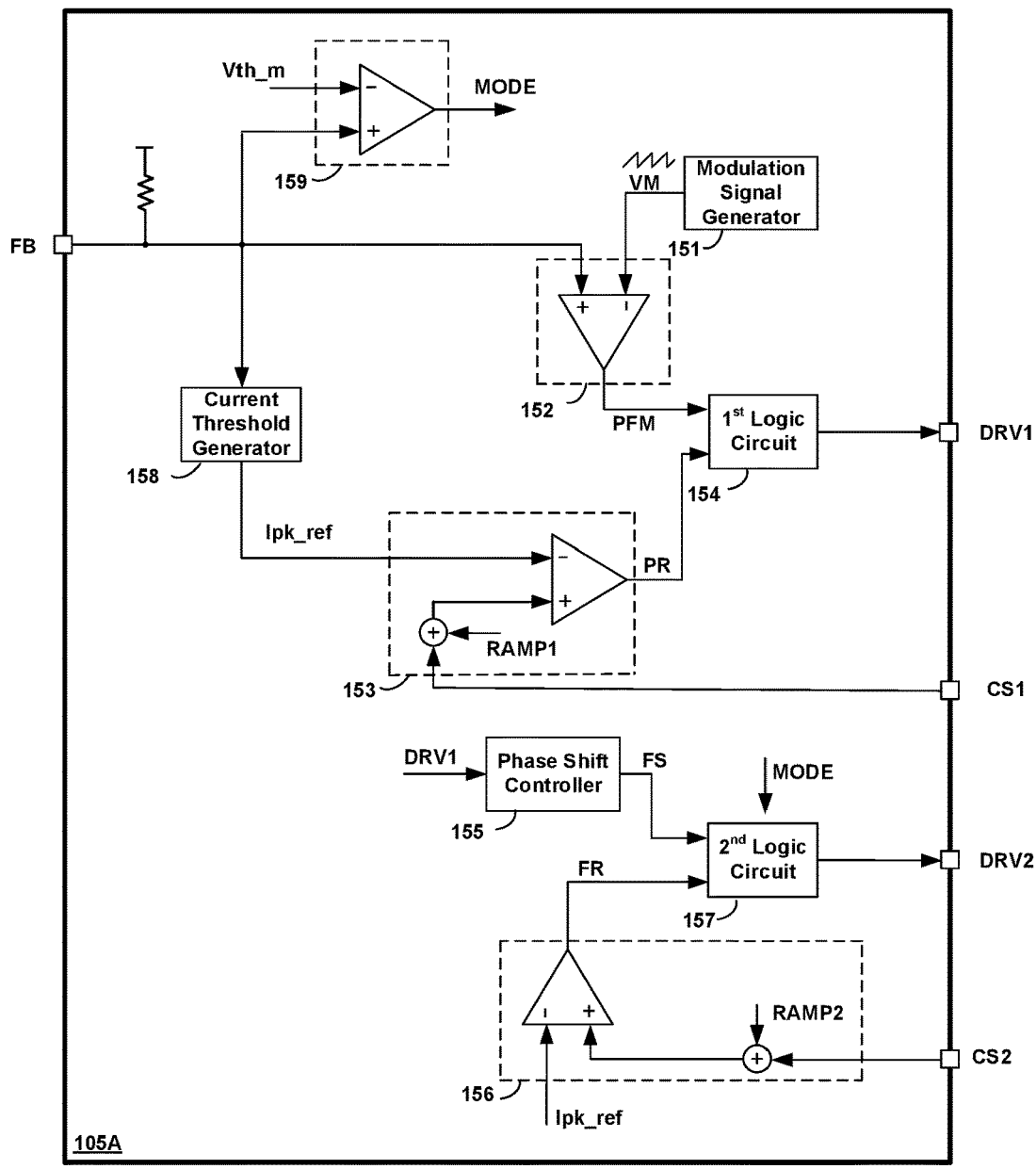
FIG. 3 schematically illustrates a converter control circuit 105A in accordance with an embodiment of the present invention.

FIG. 3 is a circuit schematic diagram of the converter control circuit 105A in accordance with an embodiment of the present invention. It includes a modulation signal generator 151, a first comparison circuit 152, a second comparison circuit 153, a first logic circuit 154, a phase shift controller 155, a third comparison circuit 156 and s second logic circuit 157.

The modulation signal generator 151 is configured to generate a modulation signal VM, which could be a sawtooth signal in some embodiments. The first comparison circuit 152 has a first input terminal, a second input terminal and an output terminal, wherein the first input terminal is configured to receive the feedback signal FB indicative of the total output voltage Vo, and the second input terminal is coupled to the modulation signal generator 151 to receive the modulation signal VM. Based on the feedback signal FB and the modulation signal VM, the first comparison circuit 152 generates a first comparison signal PFM at its output terminal to control turning on of the switch S1.

The second comparison circuit 153 has a first input terminal, a second input terminal and an output terminal. The first input terminal is configured to receive the current sensing signal CS1 representing the current flowing through the switch S1, and the second input terminal is configured to receive a current threshold reference signal Ipk_ref. Based on the current sensing signal CS1 and the current threshold reference signal Ipk_ref, the second comparison circuit 153 generates a second comparison signal PR at its output terminal to control turning off of the switch S1. In one embodiment, the current threshold reference signal Ipk_ref is related to the feedback signal FB. The converter control circuit 105A further includes a current threshold generator 158. The current threshold generator 158 is configured to receive the feedback signal FB and generate the current threshold reference signal Ipk_ref based thereupon.

The first logic circuit 154 has a first input terminal, a second input terminal and an output terminal. The first input terminal is coupled to the first comparison circuit 152 to receive the first comparison signal PFM, and the second input terminal is coupled to the second comparison circuit 153 to receive the second comparison signal PR. Based on the first comparison signal PFM and the second comparison signal PR, the first logic circuit 154 generates the first control signal DRV1 at its output terminal.

The phase shift controller 155 is coupled to the first logic circuit 154 to receive the first control signal DRV1. The phase shift controller 155 performs phase shift function based on the first control signal DRV1, and generates a turn-on control signal FS to control turning on of the switch S2. The time required for the switch S1 to perform a complete switching action is one switching period. The phase shift controller 155 can turn on the switch S2 half a switching period after the switch S1 starts to be turned on. The third comparison circuit 156 has a first input terminal, a second input terminal and an output terminal, wherein the first input terminal is configured to receive the current sensing signal CS2 representing the current flowing through the switch S2, and the second input terminal is configured to receive the current threshold reference signal Ipk_ref. Based on the current sensing signal CS2 and the current threshold reference signal Ipk_ref, the third comparison circuit 156 generates a third comparison signal FR at its output terminal to control turning off of the switch S2. In order to ensure system stability, slope compensation signals, such as signals RAMP1 and RAMP2 shown in FIG. 3, are often introduced into the second comparison circuit 153 and the third comparison circuit 156. Working principle of slope compensation is well known in the art, thus is not described here for brevity.

The second logic circuit 157 has a first input terminal, a second input terminal and an output terminal, wherein the first input terminal is coupled to the phase shift controller 155 to receive the turn-on control signal FS, and the second input terminal is coupled to the third comparison circuit 156 to receive the third comparison signal FR. Based on the turn-on control signal FS and the third comparison signal FR, the second logic circuit 157 generates the second control signal DRV2 at its output terminal.

In one embodiment, the converter control circuit 105A further includes a mode decision circuit 159. The mode decision circuit 159 compares the feedback signal FB with a mode threshold signal Vth_m to determine whether the switching power supply is in a low output voltage state. Based on the comparison result, the mode decision circuit 159 generates a mode signal MODE which determines whether the switching power supply works in a single converter mode (that is, whether the switching converter 102 is disabled). The mode signal MODE is provided to the second logic circuit 157 to keep the switch S2 off when the switching power supply is in the low output voltage state.

Figure 4A:
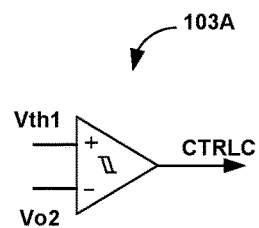
FIG. 4A to FIG. 4C are schematic circuit diagrams of bypass control circuits in accordance with different embodiments of the present invention.
Figure 4B:
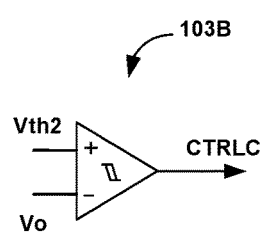
Figure 4C:
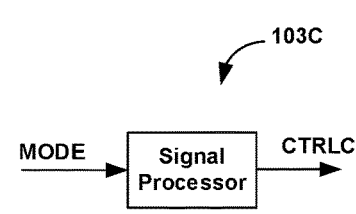

FIG. 4A to FIG. 4C are schematic circuit diagrams of bypass control circuits in accordance with different embodiments of the present invention. In the embodiment shown in FIG. 4A, the bypass control circuit 103A performs a hysteresis comparison between the second output voltage Vo2 (or a sensing signal representing the voltage) and the first threshold voltage Vth1 to generate the bypass control signal CTRLC. In the embodiment shown in FIG. 4B, the bypass control circuit 103B performs a hysteresis comparison between the total output voltage Vo (or a sensing signal representing the voltage) and the second threshold voltage Vth2 to generate the bypass control signal CTRLC. Further in the embodiment shown in FIG. 4C, unlike the previous two embodiments, the bypass control circuit 103C detects (directly or indirectly) whether the switching converter 102 has been disabled, and generates the bypass control signal CTRLC based thereupon. For example, the bypass control circuit 103C could detect the switching converter 102 has been disabled based on the aforementioned mode signal MODE, and turn on the bypass switch Sc accordingly.

Figure 5:
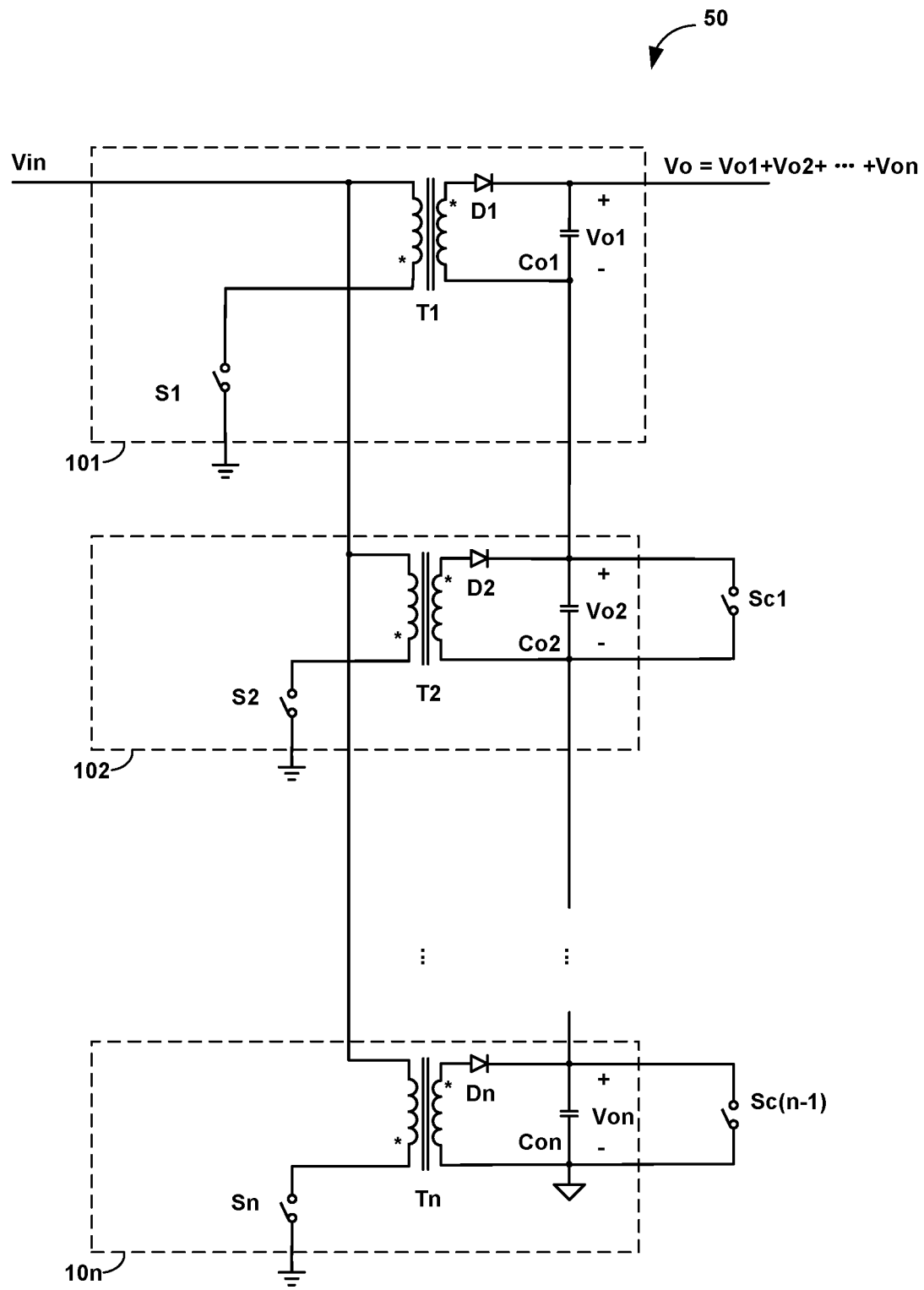
FIG. 5 and FIG. 6 schematically illustrate multi-converter switching power supplies in accordance with other embodiments of the present invention.

In addition to dual-converter switching power supplies described in the embodiments above, the switching power supply according to the present invention can also include three or more switching converters, as shown in FIG. 5. In the embodiment shown in FIG. 5, the switching converter 101 is a master switching converter, and the rest (102-10$n$) are all slave switching converters, wherein n is an integer greater than or equal to 3. The master switching converter 101 receives an input voltage Vin and converts it into an output voltage Vo1. The switching converters 102-10$n$ also receive the input voltage Vin and respectively convert it into output voltages Vo2-Von. A sum of all the output voltages is provided to a load as a total output voltage Vo. For each of the slave switching converters, there is a bypass switch coupled in parallel with the output capacitor. This bypass switch is used to bypass the output capacitor, when the voltage across the corresponding output capacitor approaches a negative voltage.

Figure 6:
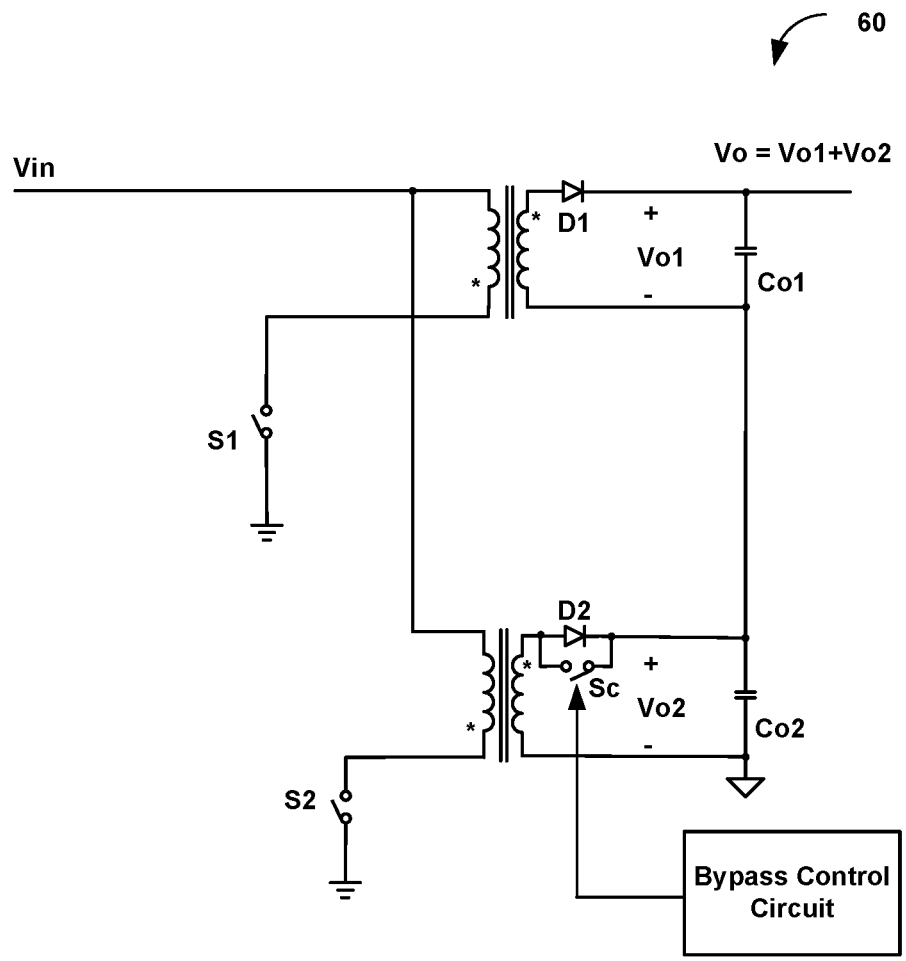

Although the output capacitor in foregoing embodiments is shown as a single discrete capacitor, it can be a combination of multiple capacitors in practical applications. Moreover, location of the bypass switch could be adjusted as long as it can realize a function of bypassing the output capacitor. For instance, in the embodiment shown in FIG. 6, the bypass switch Sc is arranged in parallel with the diode D2. In some cases where the bypass switch Sc is a MOSFET, the diode D2 can even be realized by a body diode of the bypass switch Sc.

Flyback converter is used as an example of the switching converter in the embodiments described above, however, those skilled in the art can understand that this is not intended to limit the present invention. Other suitable topologies, such as forward, buck, boost and buck-boost converters are also applicable. And switches used in the converters can be any suitable semiconductor devices. Moreover, besides MOSFET, the bypass switch Sc can also use other types of device, such as bipolar junction transistor (BJT), relay, and so on. The bypass switch Sc and the bypass control circuit can be either separated from each other or integrated together, and all these modifications do not depart from the spirit and scope of the present invention.

Figure 7:
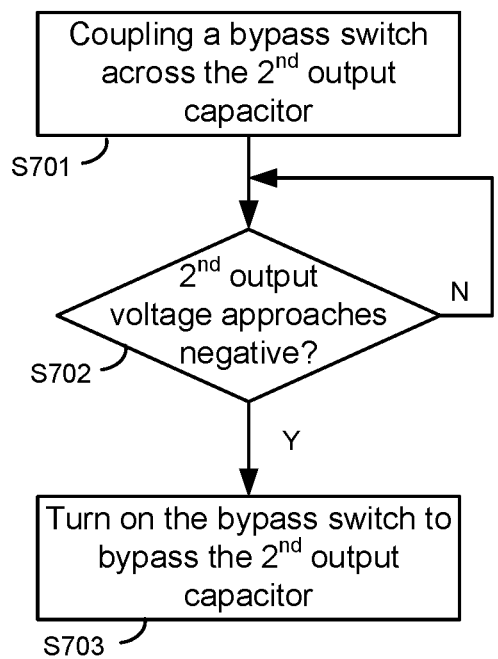
FIG. 7 is a working flowchart of a control method used in a multi-converter switching power supply in accordance with an embodiment of the present invention.

FIG. 7 is a flowchart of a control method used in a multi-converter switching power supply in accordance with an embodiment of the present invention. The multi-converter switching power supply includes a first switching converter with a first output capacitor, and a second switching converter with a second output capacitor. Input terminals of the first and second switching converters are coupled in parallel to receive an input voltage. The first and second switching converters respectively converts the input voltage into a first output voltage and a second output voltage.

Output terminals of the first and second switching converters are coupled in series to provide a total output voltage to a load. The control method includes steps S701 to S703.

In step S701, a bypass switch is coupled across the second output capacitor.

In step S702, it is determined whether the second output voltage approaches a negative voltage. If yes, step S703 is then proceeded. In some exemplary embodiments, whether the second output voltage approaches a negative voltage could be detected through comparing the second output voltage with a first threshold voltage, or comparing the total output voltage with a second threshold voltage.

In step S703, the bypass switch is turned on to bypass the second output capacitor, thereby preventing the second output capacitor from being damaged by a reverse DC voltage.

In some embodiments, the control method further includes: determining whether the switching power supply is in a low output voltage state; and disabling the second switching converter when detecting that the switching power supply is in the low output voltage state. As a further step, the bypass switch could be turned on when it is detected that the second switching converter has been disabled.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims.

What is claimed is:

1. A multi-converter switching power supply, comprising:
    a first switching converter having a first input terminal, a second input terminal, a first output terminal, a second output terminal, and a first output capacitor coupled between the first output terminal and the second output terminal, wherein the first and second input terminals are configured to receive an input voltage, the first switching converter is configured to convert the input voltage into a first output voltage across the first and second output terminals;
    a second switching converter having a first input terminal, a second input terminal, a first output terminal, a second output terminal, and a second output capacitor coupled between the first output terminal and the second output terminal, wherein the first and second input terminals are configured to receive the input voltage, the second switching converter is configured to convert the input voltage into a second output voltage across the first and second output terminals, and wherein the first output terminal of the second switching converter is coupled to the second output terminal of the first switching converter, the first output terminal of the first switching converter and the second output terminal of the second switching converter are configured to provide a total output voltage to a load;
    a bypass switch having a first terminal, a second terminal and a control terminal, wherein the first terminal is coupled to the first output terminal of the second switching converter, and the second terminal is coupled to the second output terminal of the second switching converter; and
    a bypass control circuit coupled to the control terminal of the bypass switch and configured to detect whether the second output voltage approaches a negative voltage, wherein when the second output voltage is detected to approach a negative voltage, the bypass control circuit turns on the bypass switch to bypass the second output capacitor, so as to protect the second output capacitor from being damaged by a reverse DC voltage.

2. The multi-converter switching power supply of claim 1, wherein the bypass control circuit compares the second output voltage with a first threshold voltage, and turns on the bypass switch when the second output voltage is detected to be lower than the first threshold voltage.

3. The multi-converter switching power supply of claim 1, wherein the bypass control circuit compares the total output voltage with a second threshold voltage, and turns on the bypass switch when the total output voltage is detected to be lower than the second threshold voltage.

4. The multi-converter switching power supply of claim 1, wherein the second switching converter is disabled when the multi-converter switching power supply is in a low output voltage state.

5. The multi-converter switching power supply of claim 4, wherein the bypass control circuit turns on the bypass switch when detecting that the second switching converter has been disabled.

6. The multi-converter switching power supply of claim 4, wherein a feedback signal indicative of the total output voltage is compared with a mode threshold signal to determine whether the switching power supply is in the low output voltage state.

7. The multi-converter switching power supply of claim 1, wherein the total output voltage is a sum of the first output voltage and the second output voltage.

8. A control method used in a multi-converter switching power supply, wherein the multi-converter switching power supply includes a first switching converter with a first output capacitor and a second switching converter with a second output capacitor, input terminals of the first and second switching converters are coupled in parallel, output terminals of the first and second switching converters are coupled in series to provide a total output voltage to a load, wherein the control method comprises:
    coupling a bypass switch across the second output capacitor;
    determining whether the multi-converter switching power supply is in a low output voltage state;
    disabling the second switching converter when the switching power supply is in the low output voltage state; and
    turning on the bypass switch to bypass the second output capacitor, so as to protect the second output capacitor from being damaged by a reverse DC voltage.

9. The control method of claim 8, further comprising:
    comparing a second output voltage generated by the second switching converter with a first threshold voltage;
    wherein the bypass switch is turned on when the second output voltage is detected to be lower than the first threshold voltage.

10. The control method of claim 8, further comprising:
    comparing the total output voltage with a second threshold voltage;
    wherein the bypass switch is turned on when the total output voltage is detected to be lower than the second threshold voltage.

11. The control method of claim 8, wherein a feedback signal indicative of the total output voltage is compared with a mode threshold signal to determine whether the switching power supply is in the low output voltage state.

12. A converter control circuit of a multi-converter switching power supply, wherein the multi-converter switching power supply includes a first switching converter with a first switch and a first output capacitor, a second switching converter with a second switch and a second output capacitor, and a bypass switch coupled across the second output capacitor, input terminals of the first and second switching converters are coupled in parallel to receive an input voltage, output terminals of the first and second switching converters are coupled in series to provide a total output voltage to a load, the converter control circuit comprising:
- a modulation signal generator configured to generate a modulation signal;
- a first comparison circuit coupled to the modulation signal generator, wherein the first comparison circuit is configured to generate a first comparison signal based on the modulation signal and a feedback signal indicative of the total output voltage;
- a second comparison circuit configured to generate a second comparison signal based on a current threshold reference signal and a first current sensing signal representing a current flowing through the first switch;
- a first logic circuit coupled to the first comparison circuit and the second comparison circuit, wherein based on the first comparison signal and the second comparison signal, the first logic circuit generates a first control signal to control the first switch;
- a phase shift controller coupled to the first logic circuit, wherein the phase shift controller is configured to generate a turn-on control signal based on the first control signal;
- a third comparison circuit configured to generate a third comparison signal based on the current threshold reference signal and a second current sensing signal representing a current flowing through the second switch; and
- a second logic circuit coupled to the phase shift controller and the third comparison circuit, wherein based on the turn-on control signal and the third comparison signal, the second logic circuit generates a second control signal to control the second switch.

13. The converter control circuit of claim 12, further comprising:
- a current threshold generator configured to generate the current threshold reference signal based on the feedback signal.

14. The converter control circuit of claim 12, further comprising:
- a mode decision circuit configured to compare the feedback signal with a mode threshold signal to generate a mode signal, wherein the mode signal is provided to the second logic circuit, to keep the second switch off when the multi-converter switching power supply is in a low output voltage state.

15. The converter control circuit of claim 12, wherein the total output voltage is a sum of a first output voltage generated by the first switching converter and a second output voltage generated by the second switching converter.

16. The converter control circuit of claim 12, wherein the first and second switching converters are both flyback converters.

* * * * *